United States Patent

Fan

(10) Patent No.: US 8,007,309 B2
(45) Date of Patent: Aug. 30, 2011

(54) SWAYABLE ELECTRONIC CONNECTOR WITH ALIGNING STRUCTURE AND ELECTRONIC APPARATUS EMPLOYING THE SAME

(75) Inventor: Chien-Ming Fan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/796,766

(22) Filed: Jun. 9, 2010

(65) Prior Publication Data

US 2011/0008991 A1    Jan. 13, 2011

(30) Foreign Application Priority Data

Jul. 9, 2009   (TW) ............................... 98123157 A

(51) Int. Cl.
*H01R 13/64* (2006.01)
(52) U.S. Cl. ....................................................... 439/376
(58) Field of Classification Search .................. 439/376, 439/367, 378, 247, 248
See application file for complete search history.

(56) References Cited

U.S. PATENT DOCUMENTS

| | | | |
|---|---|---|---|
| 6,146,184 A * | 11/2000 | Wilson et al. | 439/374 |
| 6,196,856 B1 * | 3/2001 | De Villeroche | 439/248 |
| 6,270,371 B1 * | 8/2001 | Doushita | 439/376 |
| 7,056,144 B2 * | 6/2006 | Barsun et al. | 439/362 |
| 7,168,993 B2 * | 1/2007 | Hashim | 439/676 |
| 7,798,835 B1 * | 9/2010 | Lee et al. | 439/248 |
| 7,850,480 B2 * | 12/2010 | Takanashi et al. | 439/376 |

* cited by examiner

*Primary Examiner* — Chandrika Prasad
(74) *Attorney, Agent, or Firm* — Altis Law Group, Inc.

(57) ABSTRACT

An electronic connector includes a cover, a connector body, and an aligning body. The cover defines an opening therein. The connector body partially extends through the opening, and defines an interspace between the cover and the connector body so the connector body is capable of swaying in the opening. The aligning body includes a top portion secured to the connector body, and two supporting legs arranged at two opposite sides of the top portion to support the connector body. The aligning body is swayable to vary the distance of the two opposite sides of the top portion from the cover along the sway directions that are inclined towards the two opposite sides of the top portion.

11 Claims, 7 Drawing Sheets

SWAYABLE ELECTRONIC CONNECTOR WITH ALIGNING STRUCTURE AND ELECTRONIC APPARATUS EMPLOYING THE SAME

BACKGROUND

1. Technical Field

The present disclosure relates to electronic connectors, and particularly to an electronic connector employed by an electronic apparatus.

2. Description of Related Art

Electronic connector pairs are connected together for electrically coupling two electronic apparatuses together. However, misalignment may occur when the electronic connector pairs come into contact.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
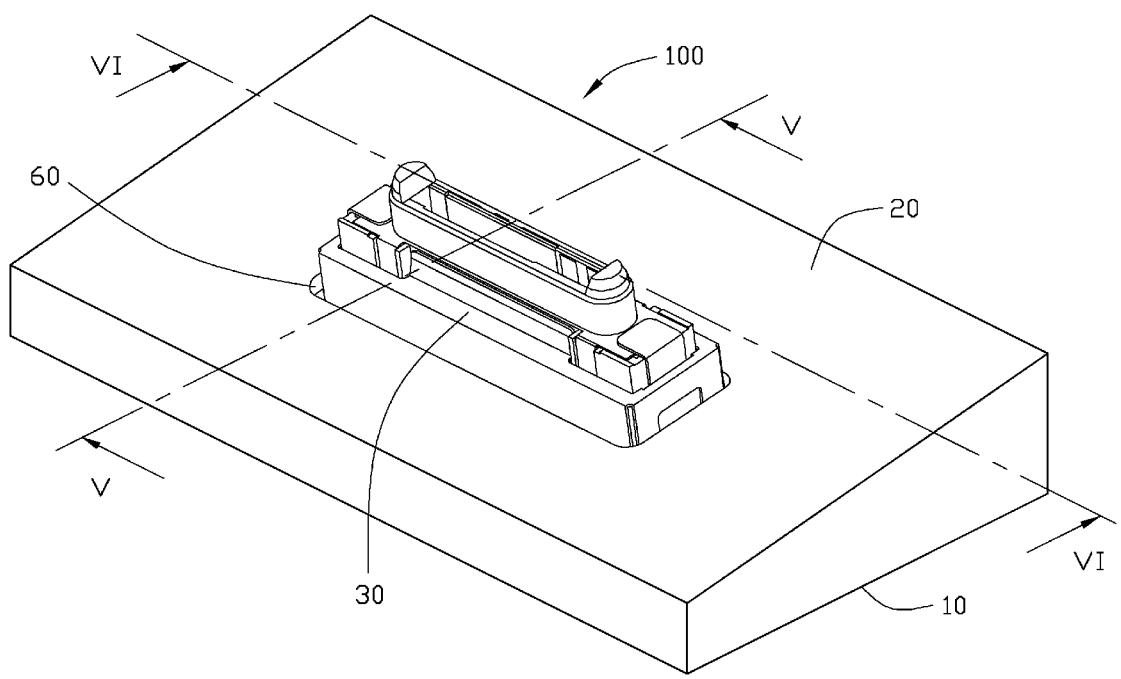
FIG. 1 is an isometric view of an electronic connector in accordance with an exemplary embodiment.
Figure 2:
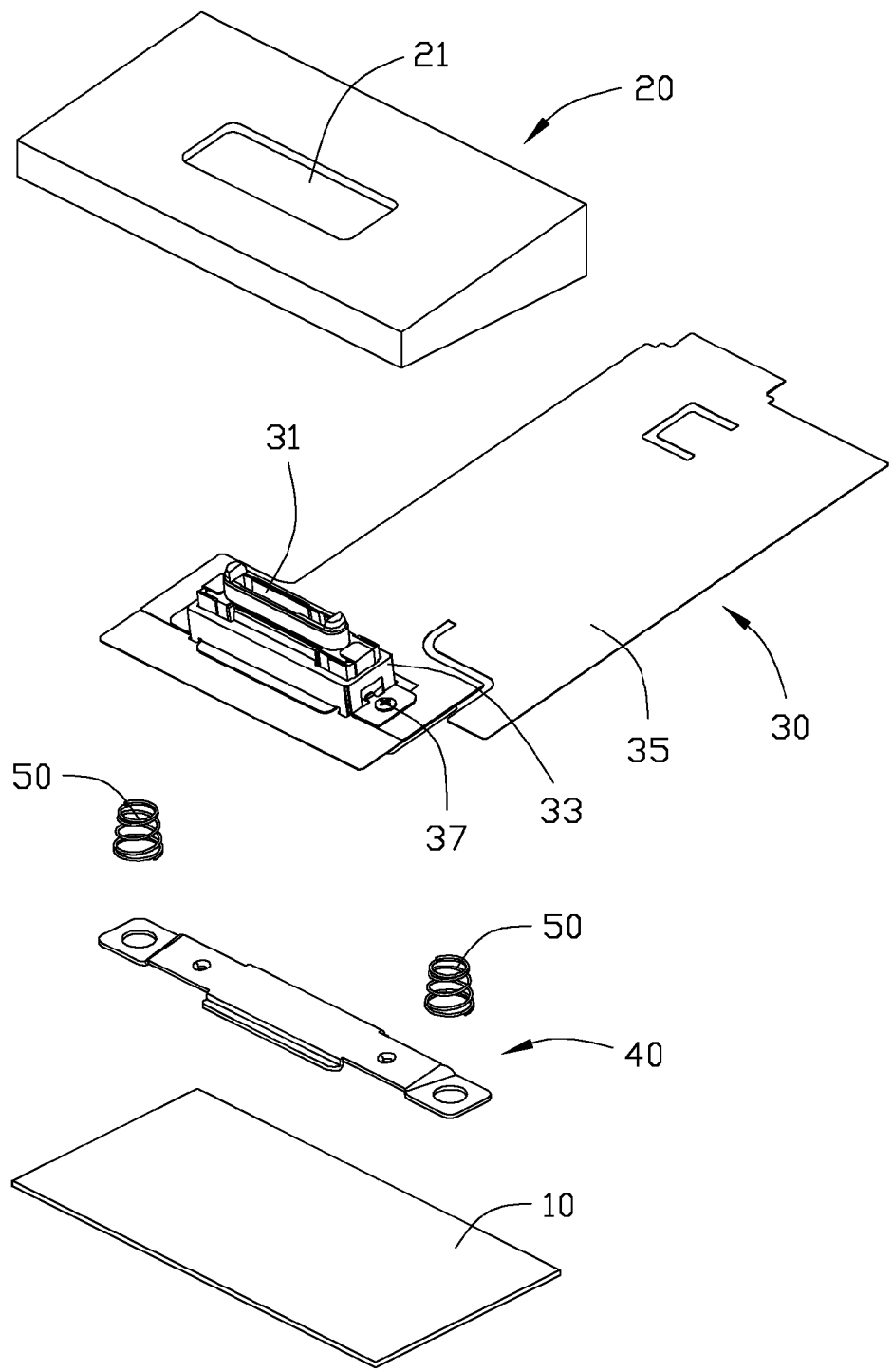
FIG. 2 is an exploded, isometric view of the electronic connector of FIG. 1 with an aligning body.

Referring to FIGS. 1-2, an electronic connector 100 includes a base plate 10, a cover 20, a connector body 30, and an aligning body 40. The cover 20 covers the base plate 10 and cooperates with the base plate 10 to define a receiving space. The connector body 30 is secured to the aligning body 40, and together with the aligning body 40 is received between the receiving space defined by the base plate 10 and cover 20. The aligning body 40 is placed on the base plate 10. The connector body 30 partially extends through the cover 20 for electrically connecting with a peripheral device (not shown).

Figure 3:
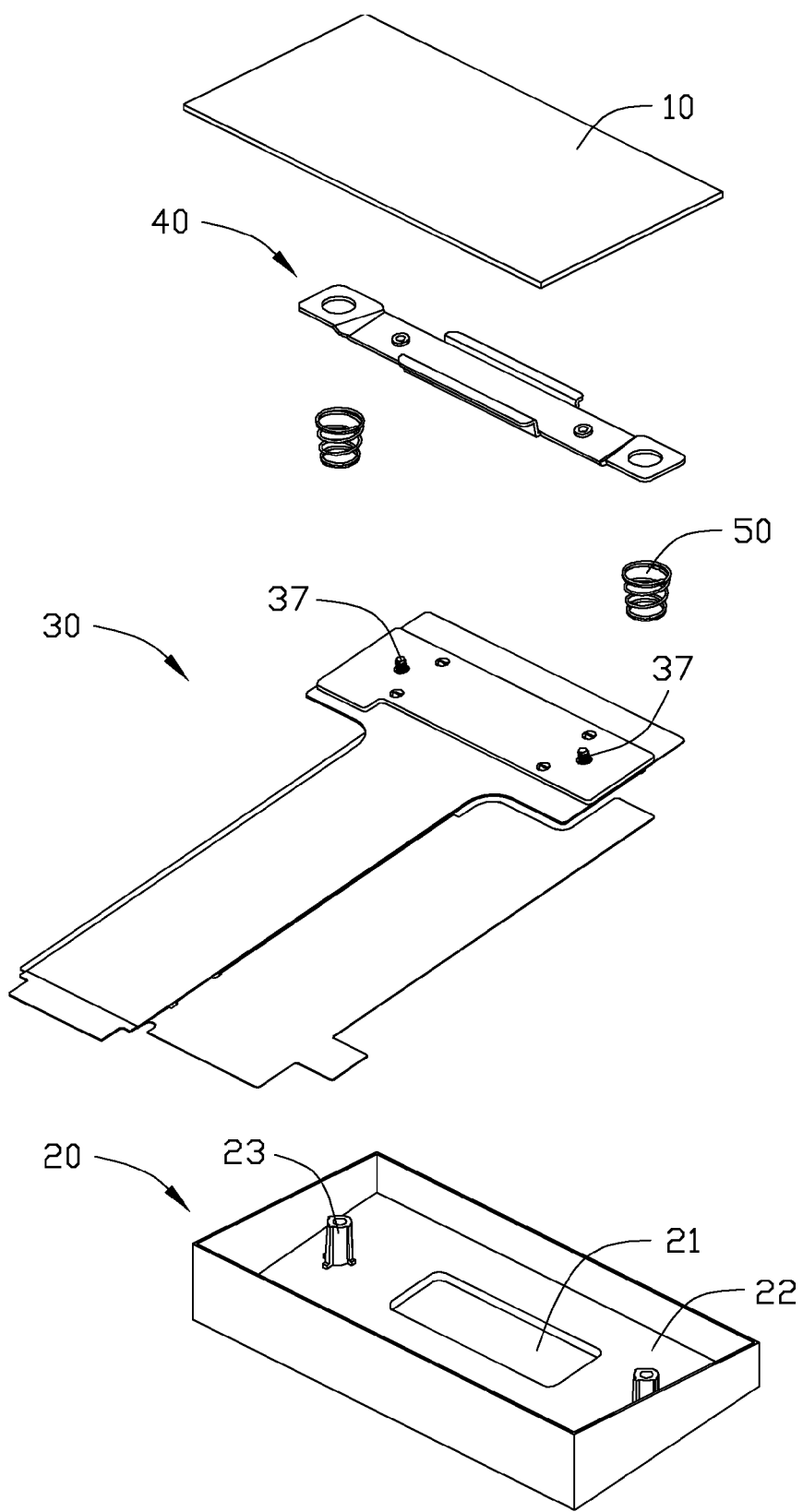
FIG. 3 is an exploded, isometric view of the electronic connector in FIG. 1 from a reverse direction from FIG. 2.

Referring also to FIG. 3, the cover 20 defines an opening 21 to allow the connector body 30 to partially extend therethrough. A pair of positioning posts 23 extend from a bottom surface 22 of the cover 20 to the base plate 10. The opening 21 is defined between the pair of positioning posts 23.

The connector body 30 includes a mating portion 31, a holder 33, and a flexible PCB (printed circuit board) 35. The holder 33 is placed around the mating portion 31 and holds the mating portion 31 tightly. The holder 33 is secured to the printed circuit plate 35 via screws 37. The mating portion 31 extends through the opening 21 for coupling to the peripheral device. The opening 21 is wider than the mating portion 31 so that surrounding interspace 60 exists between the mating portion 31 and the cover 20 (referring to the FIG. 1). As a result, the mating portion 31 may be swayable to a predetermined range in the opening 21 when an external force is applied to the connector body 30.

Figure 4:
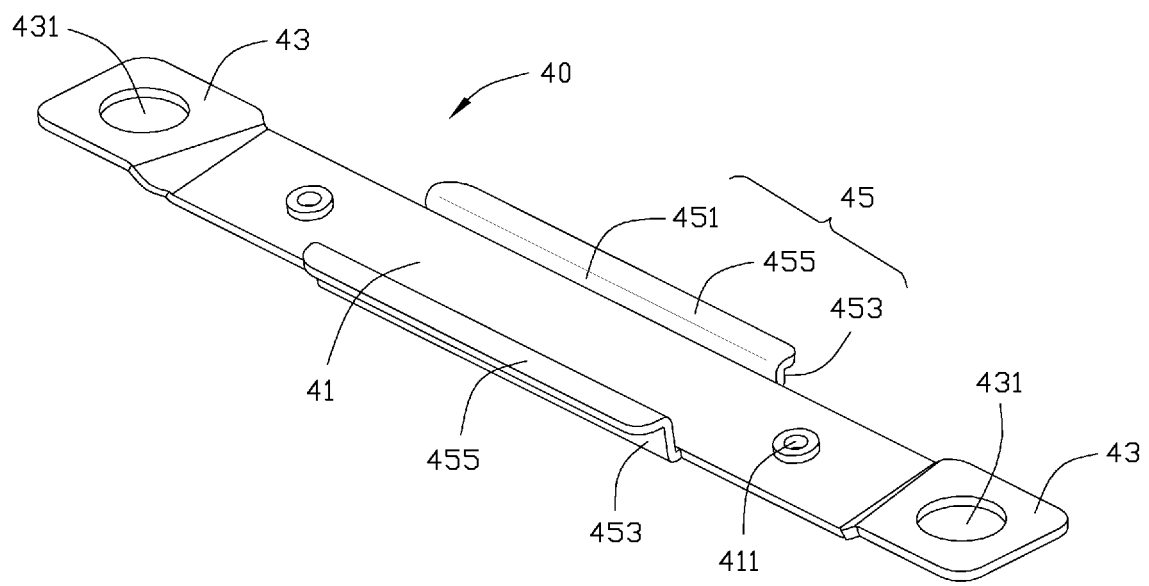
FIG. 4 is an enlarged isometric view of the aligning body in FIG. 3.

Referring also to FIG. 4, the aligning body 40 includes a top portion 41, two supporting portions 43, and two supporting legs 45. The two supporting portions 43 and the two supporting legs 45 are integrally formed on the top portion 41. The top portion 41 is a substantially rectangular plate substantially parallel to the cover 20. Two fixing holes 411 are defined in the top portion 41.

The two supporting legs 45 are substantially parallel to each other and arranged at two opposite sides of the top portion 41. The two supporting legs 45 extend downward from the top portion 41. Each supporting leg 45 includes a supporting portion 451, a joint arm 453 and a hanging arm 455 formed in two opposite sides of the supporting portions 45. One end of joint arm 453 is formed on the top portion 41 and the joint arm 453 is approximately perpendicular to the top portion 41. The hanging arm 455 is inclined to the top portion 41. The supporting portion 451 is substantially convex for smoothly connecting to the joint arm 453 and the hanging arm 455. Such that, a cross section view of the supporting leg 45 is approximately V-shaped.

The two supporting portions 43 are arranged at the two distal opposite ends of the top portion 41. Each supporting board 43 extends downward from the top portion 41, extending outward along the same substantially parallel lines. Each supporting board 43 is positioned between the top portion 41 and the supporting portion 451. A through hole 431 is defined in each supporting plate 43.

The aligning body 40 further includes two elastic elements 50 (see FIG. 3). In this embodiment, each elastic element 50 is a spring. Each elastic element 50 sleeves around one positioning post 23 accordingly, and is larger than the through holes 431 of the supporting plate 43.

Figure 5:
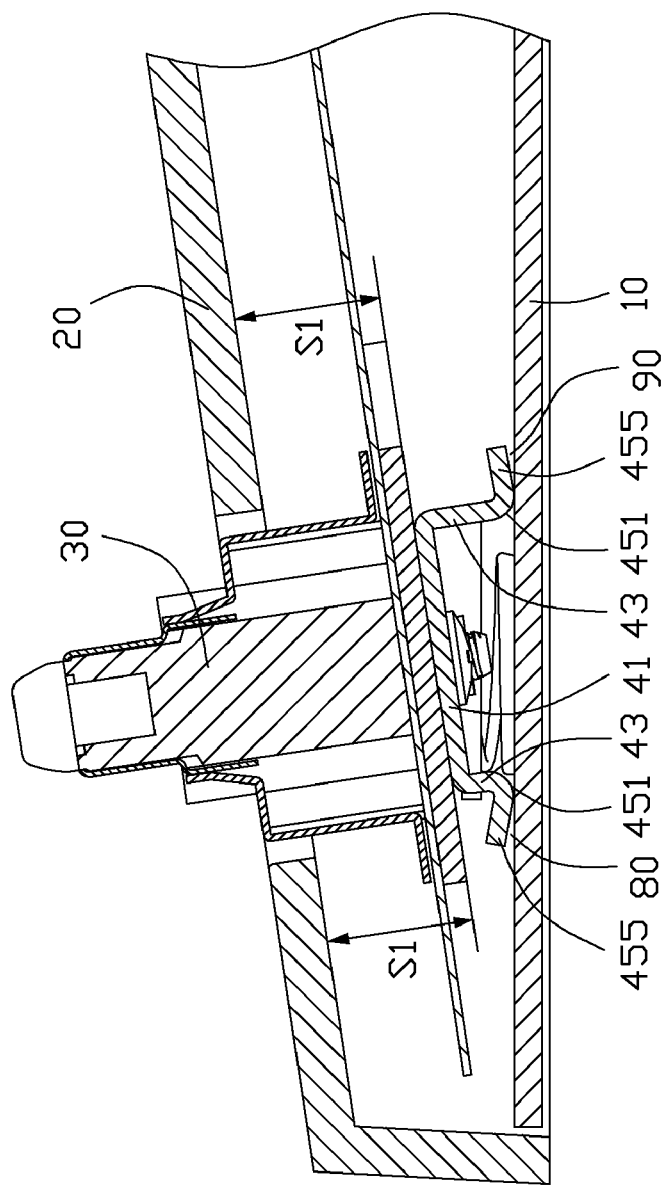
FIG. 5 is a cross-sectional view of the electronic apparatus of FIG. 1 taken along the line V-V thereof.
Figure 6:
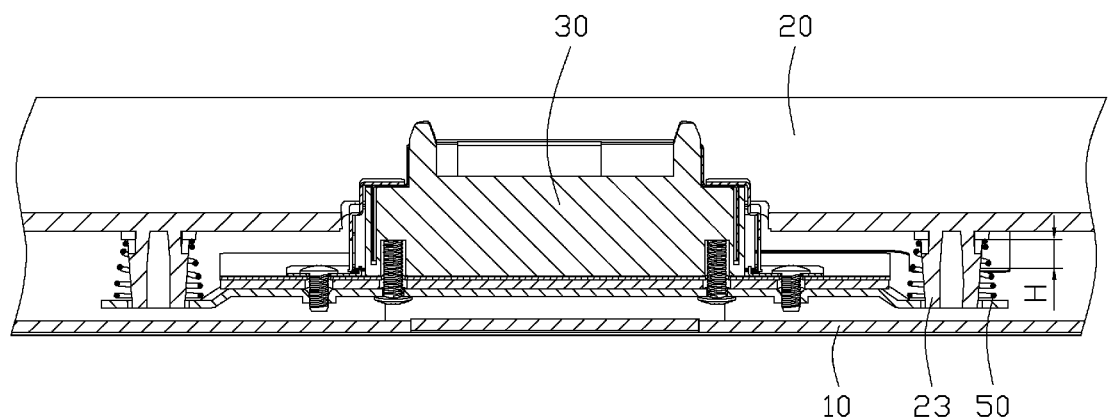
FIG. 6 is a cross-sectional view of the electronic apparatus of FIG. 1 taken along the line VI-VI thereof.

Referring to FIGS. 5-6, the base plate 10, the cover 20, the connector body 30 and the aligning body 40 may be assembled as described in the following manner. The connector body 30 is secured to the top portion 41 of the aligning body 40, with two fixing screws 37 screwed through the corresponding fixing holes 411. The supporting portions 451 of the two supporting legs 45 stand on the base board 10, and the hanging arms 455 of the two supporting legs 45 raise from the base plate 10 to define gaps 80 and 90 therebetween. The gaps 80 and 90 are large enough for the connector body 30 to incline to the hanging arm 455 of the supporting legs 45 by predetermined distances. In other words, distances S1 of the two opposite sides of the top portion 41 on which the two supporting legs 45 are formed from the cover 20 vary. The mating portion 31 and the holder 33 protrude through the opening 21. The two elastic elements 50 sleeve around the two positioning posts 23 respectively, and then cover the through holes 431 to be restricted between the cover 20 and the supporting boards 43. The two elastic elements 50 can be shorten by a length H when the aligning body 40 presses it. The length H is large enough for the connector body 30 to incline to the supporting boards 43 by predetermined distances. In other words, the distances S1 of the two opposite sides of the top portion 41 on which the two supporting boards 43 are formed from the cover 20 vary.

Figure 7:
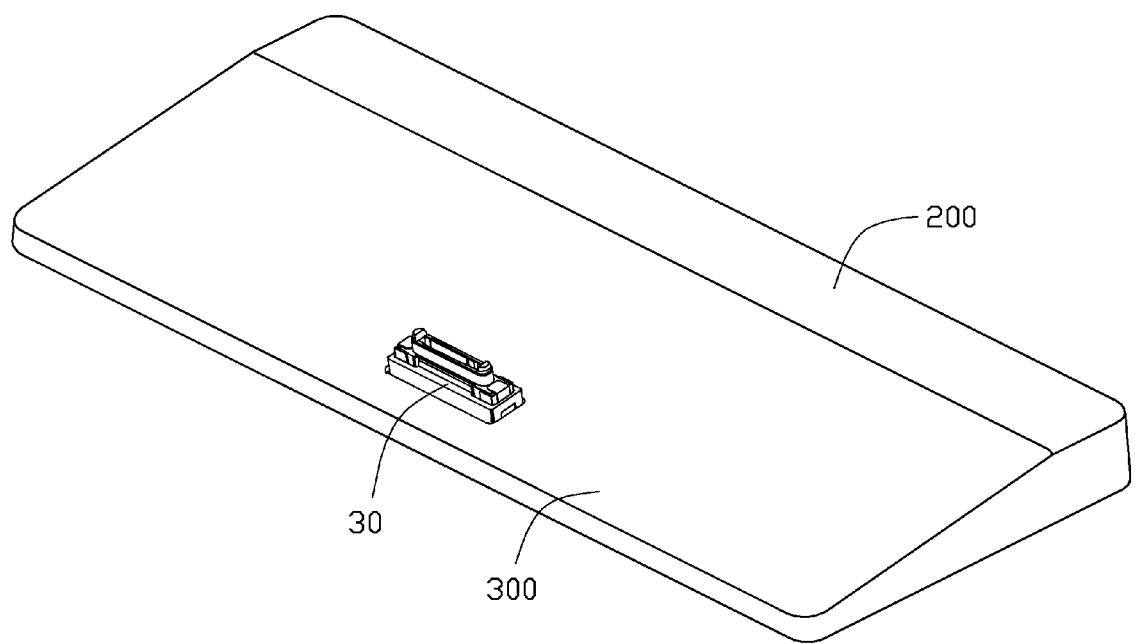
FIG. 7 is an isometric view of an electronic apparatus employing the electronic connector in FIG. 1.

Referring to FIG. 7, an electronic apparatus employing the electronic connector is shown. The electronic apparatus may be a portable computer, a docking station, or a foldable disc player. In this embodiment, the electronic apparatus is a docking station 200. The docking station 200 includes a housing 300. The previously described electronic connector 100 is secured in the housing 300. The base plate 10 and the cover 20 may be integrally formed on the housing 300. Further, the cover 20 may be integrally formed on the housing 300, and the base plate 10 is a component of the docking station 200 received in the housing 300.

A peripheral device for connecting to the docking station 200 may be a portable computer. The portable computer (not shown) includes a complementary connector configured to align with the electronic connector 100. However, in general, the complementary connector is difficult to precisely align with the electronic connector 100 on the first attempt because of the mating mechanism, such as the electronic connector 100 or complementary connector, is hidden from view by the portable computer. However, once the complementary connector is in contact with the electronic connector 100, a pressure will be applied on the mating portion 31. The pressure can push the connectors body 30 to incline within an allowable range permitted by the above-described gaps 80, or 90, or by the above-described length H, until the electronic connector 100 can precisely align with the complementary connector. Therefore, it can make the engagement between the electronic connector 100 and the complementary connector of the portable computer quite easily.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic connector comprising:
    a cover defining an opening therein;
    a connector body partially extending through the opening, and defining a surrounding interspace between the cover and the connector body so the connector body is capable of swaying in the opening; and
    an aligning body comprising a top portion secured to the connector body, and two supporting legs arranged at two opposite sides of the top portion to support the connector body, the aligning body being swayable to vary distances between the two opposite sides of the top portion and the cover along sway directions that are inclined to the two opposite sides of the top portion.

2. The electronic connector according to claim 1, wherein each supporting leg comprises a supporting portion, a joint arm, and a hanging arm, the joint arm and the hanging arm are arranged on two opposite side of the supporting portion, one end of the joint arm forms on the top portion, the supporting portion is convex, the hanging arm raises up relative to a base plate which the supporting portion stands on, and defines a gap therebetween.

3. The electronic connector according to claim 1, wherein the aligning body further comprises two elastic elements, the two elastic elements are arranged on two distal opposite ends of the top portion and restricted between the cover and the top portion.

4. The electronic connector according to claim 3, wherein a pair of positioning posts extend downward from a bottom surface to the aligning body, the opening is defined between the two positioning posts, the two elastic elements respectively sleeves on the positioning posts.

5. The electronic connector according to claim 4, wherein the aligning body further comprises two supporting boards, the two supporting boards are arranged on the two distal opposite ends of the top portion for respectively loading the two elastic elements, and the two supporting boards extend downward from the top portion and between the top portion and supporting portion.

6. The electronic connector according to claim 5, wherein a through hole is defined in each of the two supporting boards, and each elastic element covers the through hole accordingly.

7. An electronic apparatus, comprising:
    a cover defining an opening therein;
    a connector body partially extending through the opening, and defining a surrounding interspace between the cover and the connector body so the connector body is capable of swaying in the opening;
    an aligning body comprising a top portion secured to the connector body, and two supporting legs arranged at two opposite sides of the top portion to support the connector body, the aligning body being swayable to vary distances between the two opposite sides of the top portion and the cover along sway directions that are inclined to the two opposite sides of the top portion; and
    a housing for receiving the electronic connector.

8. The electronic apparatus according to claim 7, wherein each supporting leg comprises a supporting portion, a joint arm, and a hanging arm, the joint arm and the hanging arm are arranged on two opposite side of the supporting portion, one end of the joint arm forms on the top portion, the supporting portion is convex, the hanging arm raises up relative to a base plate which the supporting portion stands on, and defines a gap therebetween.

9. The electronic apparatus according to claim 8, wherein the aligning body further comprises two elastic elements, the two elastic elements are arranged on two distal opposite ends of the top portion and restricted between the cover and the top portion.

10. The electronic apparatus according to claim 9, wherein the aligning body further comprises two supporting boards, the two supporting boards are arranged on the other two opposite sides of the top portion to respectively load the two elastic elements, and the two supporting boards extend downward from the top portion and between the top portion and supporting portion.

11. The electronic apparatus according to claim 10, a through hole is defined in each of the two supporting boards, and each elastic element covers the through hole accordingly.

* * * * *